United States Patent [19]
Shibata et al.
[11] Patent Number: 4,777,494
[45] Date of Patent: Oct. 11, 1988

[54] PROCESS FOR MANUFACTURING AN ELECTROTHERMAL TRANSDUCER FOR A LIQUID JET RECORDING HEAD BY ANODIC OXIDATION OF EXPOSED PORTIONS OF THE TRANSDUCER

[75] Inventors: Makoto Shibata, Hiratsuka; Hiroto Matsuda, Ebina; Masami Ikeda, Machida; Hirokazu Komuro; Hiroto Takahashi, both of Hiratsuka; Hisanori Tsuda, Atsugi, all of Japan

[73] Assignee: Canon Kabushiki Kaisha, Tokyo, Japan

[21] Appl. No.: 9,546

[22] Filed: Feb. 2, 1987

Related U.S. Application Data

[63] Continuation of Ser. No. 692,705, Jan. 18, 1985, abandoned.

[30] Foreign Application Priority Data

Jan. 30, 1984 [JP] Japan ................................ 59-13313

[51] Int. Cl.⁴ ........................................ G01D 15/16
[52] U.S. Cl. ................................ 346/1.1; 346/140 R; 204/15; 204/38.1
[58] Field of Search ............................ 346/1.1, 140 R; 204/38.1, 15

[56] References Cited

U.S. PATENT DOCUMENTS

| | | | |
|---|---|---|---|
| 3,973,106 | 3/1976 | Ura . | |
| 4,091,391 | 5/1978 | Kozuma . | |
| 4,197,141 | 4/1980 | Bozler | 204/38.1 X |
| 4,335,389 | 6/1982 | Shirato | 346/140 |
| 4,345,262 | 8/1972 | Shirato . | |
| 4,370,668 | 1/1983 | Hara . | |
| 4,392,907 | 7/1983 | Shirato . | |
| 4,401,993 | 5/1984 | Moriyuchi . | |
| 4,450,457 | 5/1984 | Miyachi | 346/140 |
| 4,502,204 | 3/1985 | Togashi | 204/15 X |
| 4,513,298 | 4/1985 | Scheu | 346/140 |
| 4,514,254 | 4/1985 | Kledner | 204/38.1 X |
| 4,535,343 | 8/1985 | Wright | 346/140 |

*Primary Examiner*—Joseph W. Hartary
*Attorney, Agent, or Firm*—Fitzpatrick, Cella, Harper, & Scinto

[57] ABSTRACT

In a process for manufacturing an electrothermal transducer for a liquid jet recording head comprising a support, a resistive heater layer overlying the support, at least a pair of electrodes electrically connected with the resistive heater layer and disposed opposite to each other, and a protective layer composed of an insulating material, at least defective portions in the protective layer of the electrothermal transducer are subjected to an anodic oxidation treatment.

7 Claims, 6 Drawing Sheets

PROCESS FOR MANUFACTURING AN ELECTROTHERMAL TRANSDUCER FOR A LIQUID JET RECORDING HEAD BY ANODIC OXIDATION OF EXPOSED PORTIONS OF THE TRANSDUCER

This application is a continuation of application Ser. No. 692,705 filed Jan. 18, 1985, now abandoned.

BACKGROUND OF THE INVENTION

1. Field of the Invention

This invention relates to a process for manufacturing an electrothermal transducer for a liquid jet recording head capable of ejecting liquid and forming flying liquid droplets to effect recording.

2. Description of the Prior Art

Liquid ejecting recording methods (ink jet recording methods) have recently attracted attention since the noise generated during recording is negligible and the recording can be made on plain paper.

Among such recording methods, a method disclosed in Japanese Patent Application Laid-open No. 51837/1979 is different from other methods in that the motive force for ejecting liquid droplets is produced by applying thermal energy to liquid. That is, according to such method, a liquid subjected to thermal energy abruptly changes in volume due to the change in state and the force thus produced ejects the liquid from an orifice at the tip of the recording head portion to form flying liquid droplets, which to attach to a receiving member to effect recording.

The recording head portion of a recording apparatus used for the above-mentioned recording method is constituted of an orifice for ejecting liquid, a liquid ejecting portion having a liquid flow path containing, as a part of the constitution, a heat actuating portion which is communicated with the orifice and where thermal energy is applied to the liquid, and an electrothermal transducer as a means for generating thermal energy.

The above-mentioned electrothermal transducer is constituted of a resistive heater layer formed on a support, and a pair of electrodes disposed opposite to each other and connected with the resistive heater layer. The resistive heater layer has a heat generating region (heat generating portion) between the electrodes. The above-mentioned electrothermal transducer is generally provided on a support and a single or plural protective layers are provided on the surface of at least the portion contacting the liquid of the electrothermal transducer, for example, so as to protect chemically or physically the electrothermal transduder from the liquid, prevent short circuits between the electrodes through the liquid, and inhibit electrolytic corrosion caused by current flowing from the electrodes to the liquid. The protective layers may be generally produced by a thin film forming method such as sputtering, CVD, vapor deposition and the like.

However, the above-mentioned protective layers sometimes suffer from a problem that, upon forming, so-called micro-cracks are formed at an edge of the electrode portion and a defect such as a pinhole or the like is liable to form due to an incomplete washing of dust generated upon forming the layer. It is very difficult to form protective layers completely free from such defects, and when such defects are present in the protective layers, the electrodes may shortcircuit through the liquid to cause corrosion and dissolution of the electrodes and resistive heater layer resulting in disconnection of electrothermal transducer over the long term.

The above-mentioned techniques and problems in the techniques will be described below referring to the drawings.

FIG. 1A is a partial plan view in the vicinity of a heat generating portion of a substrate in a typical embodiment of a prior art liquid jet recording head. In FIG. 1A, a protecting layer for covering the surface is omitted for simplification of the explanation. FIG. 1B is a partial cross-sectional view taken along the dot and dash line XY in FIG. 1A. FIG. 2 is provided for explaining the detailed structure of the substrate in FIG. 1 and is an enlarged cross sectional view of the portion encircled with a dotted line A in FIG. 1B.

In FIG. 1A and FIG. 1B, the electrothermal transducer is constituted of a support 1, a resistive heater layer 2 formed on support 1, and electrodes 3 and 3' formed on the resistive heater layer, and a protective layer 4 is provided on the resulting assembly to protect the electrothermal transducer from ink. Resistive heater layer 2, electrodes 3 and 3', and protective layer 4 are provided on support 1 in the order as mentioned above.

Resistive heater layer 2 and electrodes 3 and 3' constituting the above-mentioned electrothemmal transducer are patterned to form a predetermined shape by means of etching or the like, and the portions other than heat generating portion 11 are patterned in the same shape. At heat generating portion 11, an electrode is not formed on resistive heater layer 2 and the resistive heater layer 2 at that portion constitutes the heat generating portion 11.

Protective layer 4 is formed on desired portions including the portions contacting the liquid above the support by means of sputtering, CVD method, vapor deposition or the like, and the resulting protective layer will usually have defects such as a micro-crack 5, a pinhole 7 or the like as shown in FIG. 2. When such defects are present in protective layer 4, the liquid filling the portions above the protective layer penetrates the defects to corrode and dissolve resistive heater layer 2 and electrodes 3 and 3' finally resulting in disconnection. Therefore, another protective layer such as an organic resin layer and the like has been heretofore usually provided on the protective layer 4. An example of a substrate of a liquid jet recording head provided with such an organic resin layer is shown in FIG. 3.

In FIG. 3, an organic resin layer is provided on the substrate having the constitution of FIG. 1, and FIG. 3 corresponds to the partial cross section of FIG. 1B. In FIG. 3, 8 is an organic resin layer which is formed on the whole surface of protective layer 4 except the portion corresponding to heat actuating portion 5 by means of spin coating, vapor deposition, plasma polymerization or the like.

However, such prior art constitution suffers from the following problems. Firstly, organic resin layer 8 contacts the liquid present thereon and therefore, during the long time use, the resin may swell or its adhesion maybe lowered. In addition, if the protective layer 4 is thick, the transfer of the heat energy generated at heat generating portion 11 to the liquid in the vicinity of said portion 11 is hindered so that the quantity of heat to be generated at the heat generating portion 11 should be increased. As a result, the deterioration of resistive heater layer 2 is accelerated. In such a case as above, the time required for heating and cooling at the heat generating portion 11 becomes long, and this works against high speed recording. Further, the temperature at heat generating portion 11 usually reaches about 200° C. so that the resin of organic resin layer 8 maybe subjected to deterioration. Therefore, heretofore an organic resin layer 8 has not been provided at the portion of protecitve layer 4 in the vicinity of heat generating portion 11 and a single layer structure, that is, only the protective layer 4, is present there as shown in FIG. 3. As a result, the organic resin layer 8 is not effective against microcrack 6 as illustrated in FIG. 2.

SUMMARY OF THE INVENTION

An object of the present invention is to provide a process for manufacturing an electrothermal transducer for a liquid jet recording head free from the above-mentioned drawbacks.

Another object of the present invention is to provide a process for manufacturing an electrothermal transducer for a liquid jet recording head which is excellent in an overall durability upon a frequent repeated use or a continuous use for a long time and can stably maintain the initial good liquid droplet forming characteristics for a long time.

A further object of the present invention is to provide a process for manufacturing an electrothermal transducer for a liquid jet recording head having a high reliability upon the fabrication processing.

According to the present invention, there is provided a process for manufacturing an electrothermal transducer for a liquid jet recording head comprising a suport, a resistive heater layer overlying the support, at least a pair of electrodes electrically connected with the resistive heater layer and disposed opposite to each other, and a protective layer composed of an insulating material, characterized in that at least defective portions in the protective layer of the electrothermal transducer are subjected to an anodic oxidation treatment.

DESCRIPTION OF THE PREFERRED EMBODIMENTS

Figure 1A:
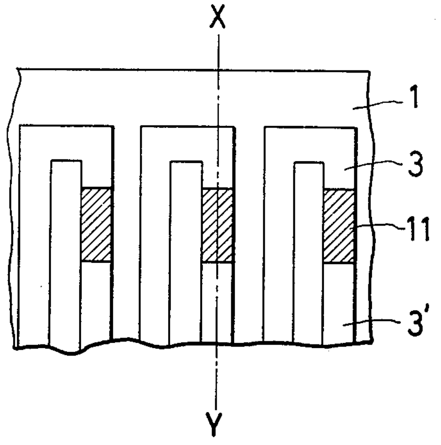
FIG.1A PRIOR ART
FIG. 1A is a partial plan view of a heat generating portion and its vicinity of a substrate in a typical embodiment of a conventional liquid jet recording head.

The present invention will be described in detail referring to the drawings.

Figure 4A:
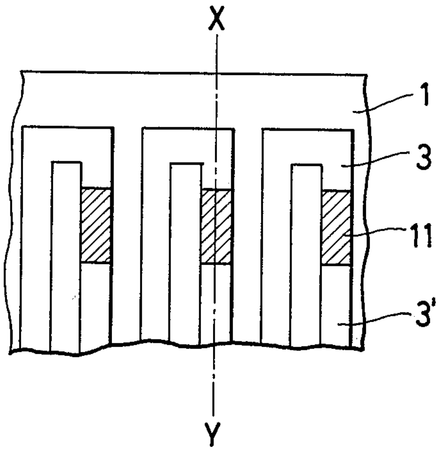
FIG. 4A is a partial plan view of a heat generating portion and its vicinity of a substrate in an embodiment of a liquid jet recording head fabricated according to the present invention.
Figure 4B:
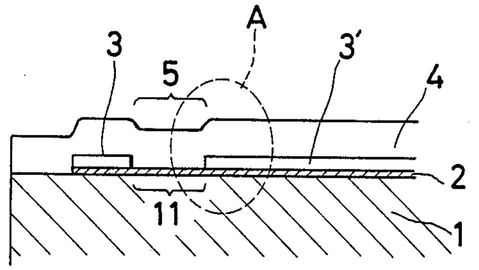
FIG. 4B is a partial cross-sectional view taken along a dot and dash line XY in FIG. 4A.

FIG. 4A is a partial plan view of a heat generating portion and its vicinity of a substrate in an embodiment of a liquid jet recording head manufactured by a process of the present invention. In FIG. 4A, a protective layer for covering the surface is omitted for simplifying the illustration. FIG. 4B is a partial cross-sectional view taken along a dot and dash line XY in FIG. 4A. In FIG. 4, the liquid flow path and the orifice member are omitted in the same way as in FIG. 1. The substrate in FIG. 4 is constructed in the same manner as the substrate of FIG. 1 except that an anodic oxidation method is used.

Figure 1B:
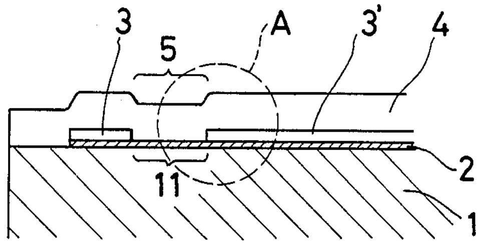
FIG.1B PRIOR ART
FIG. 1B is a partial cross-sectional view taken along a dot and dash line XY in FIG. 1A.

In FIG. 4A and FIG. 4B, 1 is a support, 2 is a resistive heater layer, 3 and 3' are electrodes, 4 a protective layer, 5 a heat actuating portion, and 11 a heat generating portion. As materials constituting the said support 1, resistive heater hayer 2, electrodes 3 and 3', and protective layer 4, those used and proposed in the art may be used widely. However, as the material constituting protective layer 4, there may be used materials having insulating property, preferably, inorganic materials.

Figure 2:
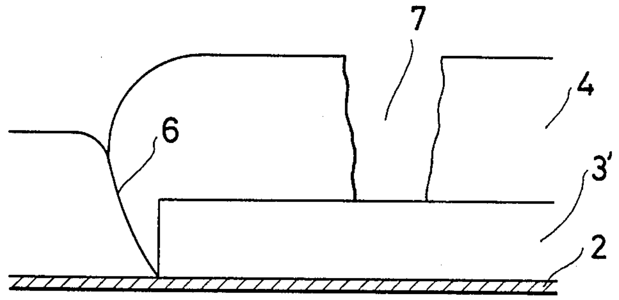
FIG.2 PRIOR ART
FIG. 2 is an enlarged view of a portion surrounded with a dotted line A shown in FIG. 1B.
Figure 3:
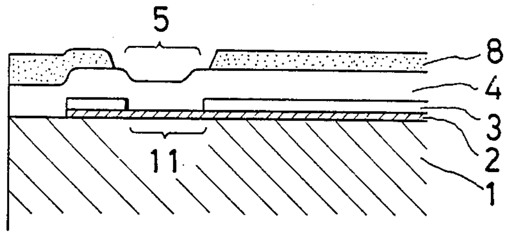
FIG.3 PRIOR ART
FIG. 3 is a partial cross-sectional view of a portion corresponding FIG. 1B in other conventional liquid jet recording head.

The process according to the present invention is illustrated below referring to the fabrication of the above-mentioned substrate. First, resistive heater layer 2 is formed on support 1 by a vapor deposition method, a sputtering method or the like and, on the upper surface thereof, electrodes 3 and 3' are further formed by the same methods. Next, by the so-called photo-etching method or the like, a part of the layer to be electrodes 3 and 3' and a part of the layer to be resistive heater layer 2 are removed successively from the top. Thereby, there are formed resistive heater layer 2, electrodes 3 and 3', and heat generating portion 11 having the desired shape on the desired position and an electrothermal transducer comprising them is constructed. Second, by the vapor deposition method, the sputtering method or the like as shown above, protective layer 4 is provided at least on the electrothermal transducer, preferably on a part of the substrate containing the electrothermal transducer. The substrate in this step may have, for example, a defect as shown in FIG. 2. Finally, electrodes 3 and 3' having such a defect as an anode are subjected to an anodic oxidation treatment. By using the anodic oxidation method, an anodic oxidation film is formed on the said defective portions, that is, the portions in which insulating property for a heat generation are not maintained. By the above-mentioned film, these defective portions in the electrothermal transducer may be protected from liquid.

A detailed construction of the substrate fabricated by the above-mentioned method according to the present invention is illustrated below referring to the substrate constructed as shown in FIG. 4. However, the following embodiments are explained with a portion corresponding to a portion surrounded with a dotted line A shown in FIG. 4B.

Figure 5:
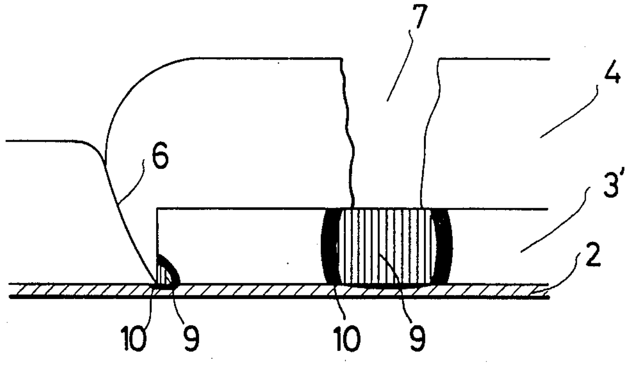
FIG. 5 is an enlarged view of a portion corresponding to a portion surrounded with a dotted line A shown in FIG. 4B in another embodiment of the present invention.

FIG. 5 shows an example of a detailed construction of a substrate subjected to an anodic oxidation treatment consisting of two steps using different electrolytes, respectively. In FIG. 5, 9 is the anodic oxidation film formed by the anodic oxidation treatment at the first step, and 10 is the anodic oxidation film formed by the anodic oxidation treatment at the second step.

These films may be formed on electrode 3' and resistive heater layer 2 at the defective portions of protective layer 4, for example, at micro-crack 6 and pinhole 7 if desired, around said portions. Further, its shape is formed such that electrode 3' and resistive heater layer 2 do not directly contact liquid. The shape of the defects in protective layer 4 such as micro-crack 6, pinhole 7 and the like remains as it is, even after having applied the anodic oxidation treatment. But, by forming the above-mentioned film on the electrode or the resistive heater layer fronting these defective portions, the electrode and the resistive heater layer are protected from electrolytic corrosion caused by direct contact between the liquid and these portions. Thereby, there is provided a stable liquid jet recording head free from disconnection or the like.

Figure 6:
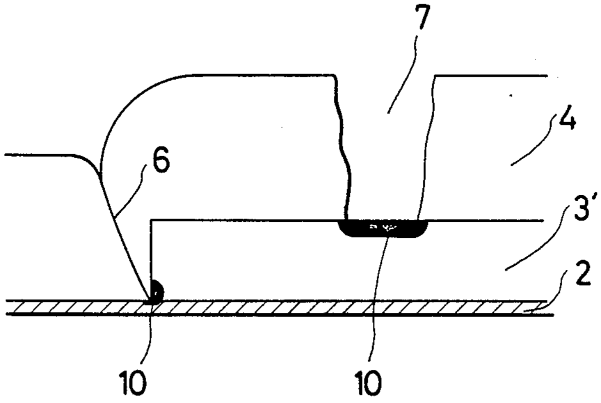
FIG. 6 is an enlarged view of a portion corresponding to a portion surrounded with a dotted line A shown in FIG. 4B in still another embodimemt of the present invention.

FIG. 6 shows an example of a substrate subjected only to the anodic oxidation treatment at the second step as shown in FIG. 5. In FIG. 6, 10 is an anodic oxidation film. Property of these films formed in the defective portions varies depending upon the kind of an electrolyte, electrolytic conditions, materials of the electrode and resistive heater layer or the like. However, these conditions are not to be construed as being particularly limitative so far as the objects of the present invention are accomplished. Further, the anodic oxidation method according to the present invention is not particularly limitative and there may be widely used generally known methods for applying the oxidation treatment to a metal such as Al, Mg, Ti, Ta and the like.

The liquid jet recording head fabricated by the process according to the present invention is accomplished by forming a liquid flow path and an orifice corresponding to the heat generating portion on the substrate formed as above.

Figure 7:
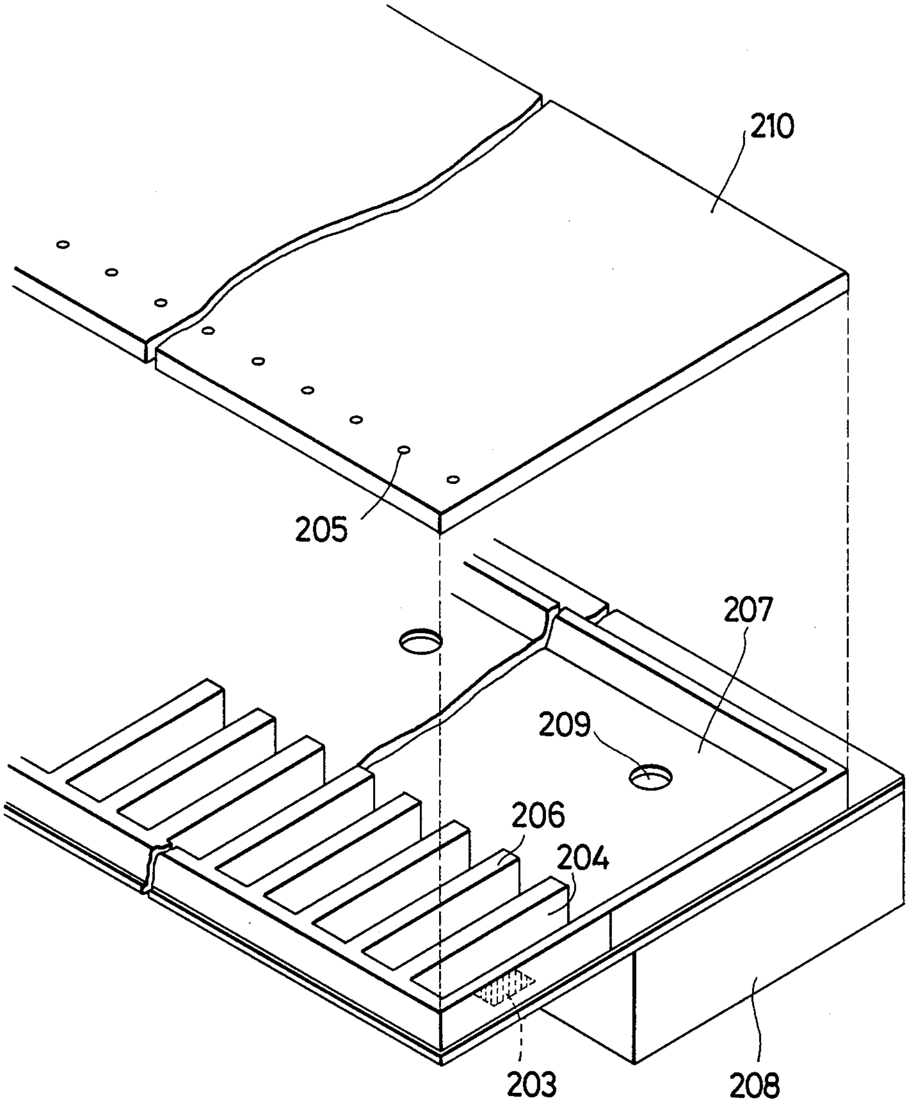
FIG. 7 is a schematically exploded view for explaining an inner construction in an embodiment of a liquid jet recording head fabricated according to the present invention.

FIG. 7 shows schematically an exploded view for explaining an inner construction of an embodiment of the accomplished liquid jet recording head. In this embodiment, orifice 205 is provided above a heat generating portion 203 (Only one is shown in the figure). In this figure, 204 is a liquid flow path, 206 an ink flow path wall, 207 a common liquid chamber, 208 a second common liquid chamber, 209 a throughhole interconnecting common liquid chamber 207 and second common liquid chamber 208, and 210 a ceiling plate. A wiring portion of the electrothermal transducer in the figure is omitted.

Figure 8:
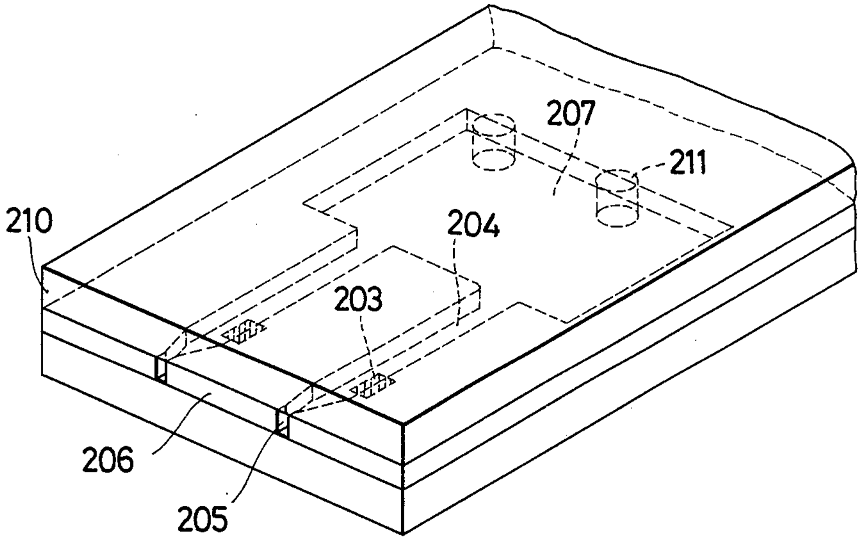
FIG. 8 is a schematic view for explaining an inner construction in another embodiment of a liquid jet recording head fabricated according to the present invention.

FIG. 8 shows schematically another embodiment of the accomplished liquid jet recording head. In this embodiment, orifice 205 is formed at the tip of the liquid flow path. 203 is a heat generating portion, 204 a liquid flow path, 206 an ink flow path wall, 207 a common liquid chamber, and 210 a ceiling plate. 211 shows an ink-supplying port.

Figure 4C:
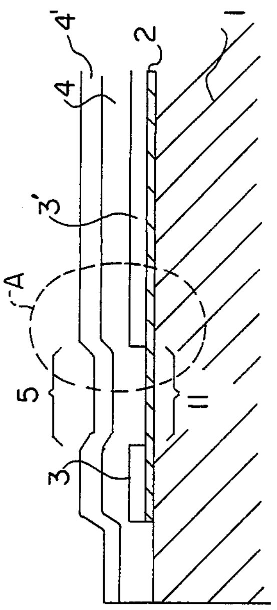
FIG. 4C is partial plan view of a heat generating portion as shown in FIG. 4B having metal layer laminated thereon.

In the case of a substrate having electrodes and a resistive heater layer insulated by the anodic oxidation as shown above, although defects exist. in the protective layer, the density of defective portions in the protective layer is zero in measurement by a copper decoration method using a methanol solution. Therefore, electrolytic corrosion of the electrodes and the resistive heater layer by the liquid does not occur, and although the defects still remain in the protective layer, there can be obtained a substrate having no problem for a practical use by forming the above-mentioned oxidation films on the electrode and the resistive heater layer. In case that a protective layer is formed as a multiple layer construction, as shown in FIG. 4C, laminating a metal layer 4 or the like on an insulating protective layer 4, the effect of the present invention is very great because a short circuit does not occur between the electrothermal transducer and the metal protective layer.

The characteristic of the present invention is to convert the liquid contacting surface of the electrothermal transducer to an insulating material by the above-mentioned anodic oxidation method, and its effect is the same even though the electrolyte and the electrolytic condition change.

Using the substrate formed as described above, the liquid jet recording head is fabricated and used, and a stable recording can be performed over a long time without the breaking or the like.

The method of the present invention is described in more detail referring to the following examples.

EXAMPLE 1

An $SiO_2$ film of 5 μm thick was formed as a substrate by thermally oxidizing an Si wafer. On the resulting substrate, a Ta layer is formed as a resistive heater layer of 3000 Å thick by sputtering, and then an Al layer of 5000 Å thick is laminated by an electron beam deposition using Al as an electrode material. Next, the electrodes and the resistive heater layer are patterned to have a predetermined shape as shown in FIG. 4A by photolithographic steps and the electrothermal transducers of a predetermined number are formed at the predetermined positions (a heat generating portion, 50 μm in width, 150 μm in length). Then, on the substrate provided with the above-mentioned electrothermal transducer, an $SiO_2$ layer of 2.2 μm thick is deposited as a protective layer by a high rate sputtering.

By the same process as described above, one hundred substrates were fabricated. Among them, 50 substrates (sample A), half the number, are subjected to the anodic oxidation treatment as described below and other 50 substrates (sample B) are used as the samples of the defective portions.

In each of sample B, a pinhole density is measured by a copper decoration method in methanol solution known generally as method for detecting the pinhole density of a passivation film. The average of the pinhole density was 6 defects/$cm^2$. The defect as shown in FIG. 2 was observed in all sample B substrates.

Figure 4D:
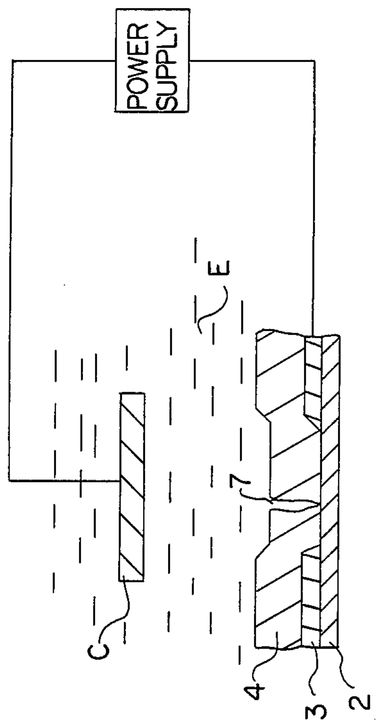
FIG. 4D is a schematic view of one embodiment of a process according to the present invention.

Next, each of the sample A substrates was subjected to the anodic oxidation treatment of two steps as described below and illustrated schematically in FIG. 4D, using an electrolyte E and a cathode C immersed therein. First, the substrate of sample A was immersed in a 10% solution of phosphoric acid and voltage of 100 V was applied only to electrode 3' as an anode for 20 minutes. Second, as the treatment at the second step, the substrate subjected to the treatment at the first step as described above was immersed in a mixture of aqueous 0.5 mol/l boric acid and 0.05 mol/l sodium tetraborate and voltage of 200 V was applied to electrodes 3' and 3 as the anode.

By the anodic oxidation treatment, the oxidation film as shown in FIG. 5 was formed on these defective portions in the substrate subjected to the anodic oxidation treatment. By the oxidation treatment at the first step, $Al_2O_3$ film was formed on portion 9 of electrode 3' in FIG. 5 and thickness of the oxidation film on resistive heater layer 2 composed of Ta was about 1000 Å. By the oxidation treatment at the second step, the oxidation film containing Al as a main component and having an excellent dielectric strength was formed on the circumference of the oxidation film on portion 9 of electrode 3' formed at the first step. In this step, thickness of the oxidation film on resistive heater layer 2 composed of Ta was about 1100 Å.

For all of the substrates of sample A subjected to the anodic oxidation treatment of the two steps, the pinhole density was measured by the copper decoration method and no pinhole was detected.

In case that the above-mentioned treatment was not effected, the pinhole density was 6 defects/$cm^2$. Therefore, very good effect was obtained by this anodic oxidation treatment.

EXAMPLE 2

According to the same process as in Example 1, 50 substrates of sample A were fabricated. Next, each of these was subjected only to the anodic oxidation treatment at the second step in Example 1. That is, each of the substrates was immersed in a mixture of aqueous 0.5 mol/l boric acid and 0.05 mol/l sodium tetraborate and voltage of 200 V was applied to electrodes 3 and 3' as an anode as shown in FIG. 4 for 20 minutes. Thereby, the anodic oxidation treatment was performed. The oxidation film having the same shape as in Example 1 was formed at these defective portions (portion 10 in FIG. 6) in the substrate. Pinhole density was measured by a copper decoration method and no pinhole was detected.

What is claimed is:

1. A process for manufacturing a liquid jet recording head, the method comprising:

providing an electrothermal transducer unit having a support, a resistive heater layer overlying the support, and at least a pair of electrodes electrically connected with the resistive heater layer and disposed opposite to each other to form a heat generating portion between the electrodes;

forming a protective layer of an insulating material on the electrothermal transducer unit;

subjecting portions of the resistive heater layer and electrodes exposed by defects in the protective layer to an anodic oxidation treatment carried out using at least one of the electrodes as an anode; and attaching a cover member to the support to form a liquid flow path corresponding to the heat generating portion and terminating at an orifice for ejecting liquid.

2. The process according to claim 1 in which the protective layer includes a plurality of protective layers.

3. The process according to claim 2 in which at least one of the protective layers is an organic resin layer.

4. The process according to claim 1 in which the anodic oxidation treatment is effected plural number of times.

5. The process according to claim 2 in which the protective layer includes an insulating protective layer and a metal layer on the insulating protective layer.

6. The process according to claim 1 in which the protective layer is an inorganic insulating material.

7. The process according to claim 2 in which at least one protective layer is an inorganic insulating material.

* * * * *

UNITED STATES PATENT AND TRADEMARK OFFICE
CERTIFICATE OF CORRECTION

PATENT NO. : 4,777,494

DATED : October 11, 1988

INVENTOR(S) : MAKOTO SHIBATA, ET AL.

It is certified that error appears in the above-identified patent and that said Letters Patent is hereby corrected as shown below:

AT [56] IN REFERENCES CITED

U.S. Patent Documents, "4/1985 Kledner" should read --4/1985 Klepner--.

COLUMN 1

Line 52, "transduder" should read --transducer--.

COLUMN 2

Line 25, "electrothemmal" should read --electrothermal--.
Line 60, "maybe" should read --may be--.

COLUMN 3

Line 3, "maybe" should read --may be--.
Line 5, "prote-" should read --protec- --.
Line 6, "citve" should read --tive--.
Line 42, "head," should read --head;--.
Line 43, "and" should be deleted.
Line 49, "corresponding FIG. 1B in other" should read --corresponding to FIG. 1B in another--.
Line 54, "invention, and" should read --invention;--.
Line 56, "FIG 4A, FIG. 4C is partial" should read --FIG 4A; FIG. 4C is a partial--.
Line 58, "metal" should read --a metal--.
Line 58, "thereon, and FIG. 4D" should read --thereon; FIG. 4D--.
Line 67, "embodimemt" should read --embodiment--.

UNITED STATES PATENT AND TRADEMARK OFFICE

CERTIFICATE OF CORRECTION

PATENT NO. : 4,777,494

DATED : October 11, 1988

INVENTOR(S) : MAKOTO SHIBATA, ET AL.

It is certified that error appears in the above-identified patent and that said Letters Patent is hereby corrected as shown below:

COLUMN 4

Line 29, "hayer 2," should read --layer 2,--.

COLUMN 5

Line 11, "7 if" should read --7 and if--.
Line 47, "(Only" should read --(only--.
Line 63, "exist." should read --exist--.

COLUMN 6

Line 6, "laminating" should read --by laminating--.
Line 7, "layer 4" (first occurrence) should read --layer 4'--.
Line 20, "the" (first occurrence) should be deleted.

Signed and Sealed this

Eleventh Day of April, 1989

*Attest:*

DONALD J. QUIGG

*Attesting Officer*

*Commissioner of Patents and Trademarks*